Aug. 25, 1931.                H. E. THOMPSON                 1,820,100
                               CRANK CASE SEAL
                              Filed Oct. 17, 1927

INVENTOR.
Harry E. Thompson
BY
Stuart C. Barnes
ATTORNEY.

Patented Aug. 25, 1931

1,820,100

UNITED STATES PATENT OFFICE

HARRY E. THOMPSON, OF DETROIT, MICHIGAN

CRANK CASE SEAL

Application filed October 17, 1927. Serial No. 226,537.

This invention relates to a crank case seal with especial reference to a seal for the crank case and the rotating crank shaft of a compressor for a mechanical refrigerating apparatus.

The invention has as an object the provision of an effective seal between a rotating shaft and a relatively stationary housing wherein the sealing action is effected without the use of packing material. According to the invention the seal is such that when once installed in place no future adjustments or tightening operations are required, as would be the case with a seal which utilizes packing material. Moreover, the invention contemplates a novel arrangement of simple construction, and which exerts only a minimum of end thrust movement on the shaft in normal operation and wherein the lubricating oil and gas pressure in crank case are utilized for aiding and effecting the seal.

Figure 1:
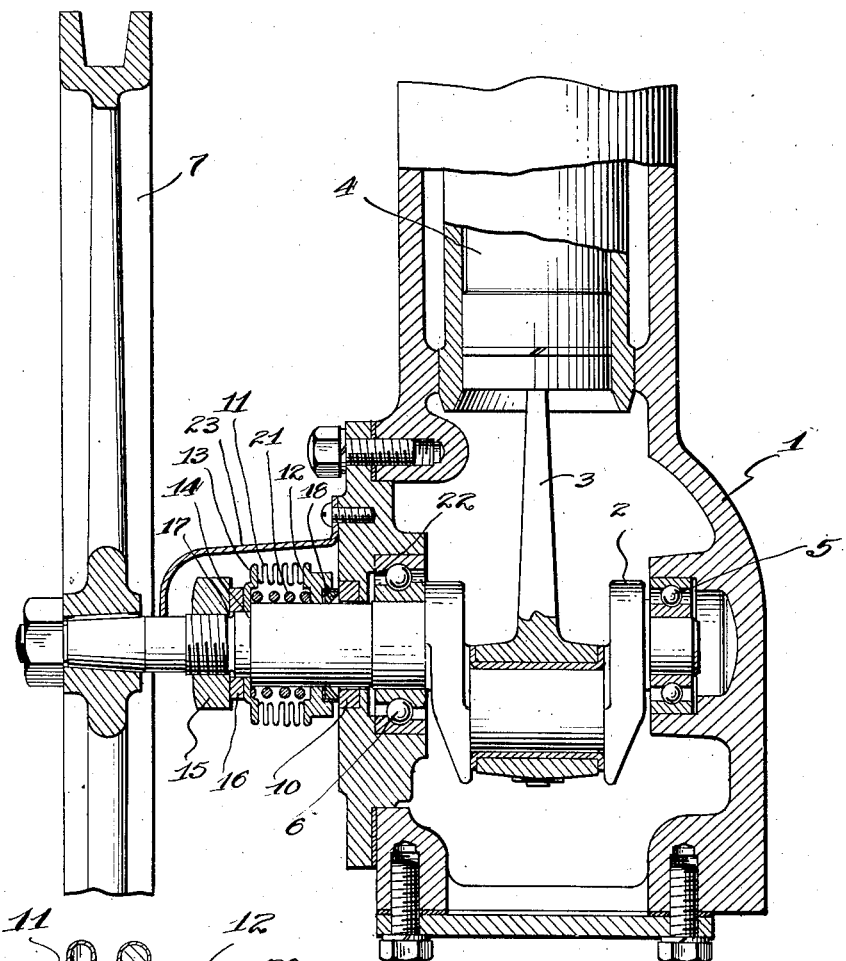
Fig. 1 is a view partly in section showing a crank case and shaft construction with the seal applied to the construction.

A crank case 1 of the mechanism, such as a compressor for a mechanical refrigerating apparatus, has journalled therein a crank shaft 2, which is in turn connected to a connecting rod 3 and piston 4. This crank shaft is journalled in bearings 5 and 6 and carries at its outer end a fly wheel 7 designed to receive a belt for operating the same from a suitable source of power (not shown). A portion of the housing is recessed adjacent the shaft for the purpose of receiving a ring 10 of steel or other suitable metal for bearing purposes. A collapsible and expansible bellows arrangement 11 has end pieces 12 and 13 mounted over the shaft. The shaft is provided with a shoulder 14 and the end piece 13 fits over the smaller portion of the shaft and abuts against this shoulder. This end member 13 is clamped tightly against this shoulder by a screw threaded nut 15, there being a washer 16 interposed between the nut and the member 13, which washer is keyed to the shaft by suitable projections 17.

Figure 2:
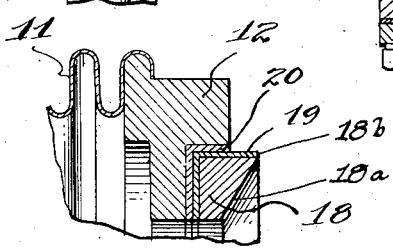
Fig. 2 is an enlarged detailed view in section showing the manner in which one of the friction members is secured to the associated parts of the seal.

The bellows arrangement is thus tightly clamped to the shaft and rotates therewith, and accordingly the end member 12 rotates with respect to the ring 10. For the purpose of effecting a seal between the ring 10 and the adjacent bellows construction, and at the same time providing for a bearing surface, a ring member 18 is fitted into the member 12, such member being recessed for the purpose of receiving the ring. This ring member may be of suitable metal or an anti-friction alloy or in the form of a carbon ring or brush. A carbon ring or brush is advantageous and for the purpose of attaching the carbon ring to the end member 12, the ring is plated with metal, such as copper, as depicted at 19 in Fig. 2, so that it may be soldered to the member 12, as shown at 20.

This sealing ring 18, whether it be metal or carbon, is preferably cut away as at 18a to provide a line contact at point 18b with the ring 10. It is to be noted that the members 10, 12 and 18, and also the adjacent part of the housing are provided with openings through which the shaft extends which are somewhat larger in diameter than the shaft. This construction permits the lubricating oil in the crank case to pass within the space between these members. The reason for this is to effect an oil seal. In the operation of the machine the oil is thrown outwardly by the centrifugal force to the line of contact between the rings 10 and 18 and thus an oil seal is had. When the ring 18 is of metal the oil also serves as a lubricant, but when a carbon ring is used no lubrication is necessary and the oil only functions as a seal. By obtaining a line contact, the relatively sharp edge quickly wears down a little and automatically seats itself, but after this slight wearing no further appreciable wear occurs, especially where a carbon ring is used.

A suitable compression spring 21 is disposed over the shaft in such a manner as to tend to separate or expand the bellows. Preferably the bearing 6 is constructed for accommodating the end thrust in the crank shaft which results from the action of the seal, the races for the balls in such bearing being suitably shouldered, as at 22, for this purpose. A suitable protector plate 23 may be secured to the housing and disposed so as to overlie the seal and to protect the same from injury.

In the operation of the machine the gases in the crank case leak through the bearing and other members and into the bellows. The escape of the gases, however, is prevented by this seal, and it will be noted that the seal is effected without involving the use of packing material. The end member 13 is clamped tightly against the shoulder on the crank shaft to form a seal at that point. A seal is also formed between the ring 18 and the ring set in the crank case. The compression spring 21 is only of sufficient strength to cause an initial seal at the line contact. It will be noted, however, that any pressure within the bellows which comes from the gases escaping from the crank case, acts to force the rings together with increased pressure to thus render a more effective seal. In other words, the greater the pressure within the bellows the greater the sealing effect which is obtained.

The action of the compression spring, and also the pressure of the gases within the bellows is such as to cause an endwise thrust on the crank shaft from right to left, as viewed in Fig. 1. It is advantageous, therefore, to utilize a bearing 6 constructed to overcome this end thrust in the crank shaft, as described in detail above.

The spring 21 is strong enough to form an initial seal so that in all normal operation the end thrust on the crank shaft, and the thrust at the line contact is at a minimum. Whenever abnormally high pressures occur in the crank case, this pressure automatically increases the pressure and seal. Thus it is not necessary to have at all times a seal, end thrust and pressure, sufficient to seal all expected pressures in the crank case. Accordingly undue wear on the parts and particularly at the line contact is prevented, and long life and perfect operation of the seal is assured.

Claim:

A seal construction for effecting a seal between a rotating shaft and a housing, comprising a bellows mounted over and in non-rotative relation with the shaft, a carbon ring member connected to one end of the bellows, means on the housing for providing a frictionally engaging seal with this carbon ring, a shoulder on the shaft, a ring-like end member connected to the opposite end of the bellows and abutting against this shoulder and means for clamping this ring-like member against the shoulder in sealing relation, and a compression spring within the bellows for urging the carbon ring against its co-operating surface.

In testimony whereof I affix my signature.

HARRY E. THOMPSON.